US009955489B2

(12) United States Patent
Jwa et al.

(10) Patent No.: US 9,955,489 B2
(45) Date of Patent: Apr. 24, 2018

(54) SMALL CELL SYSTEM AND METHOD FOR ALLOCATING RESOURCE THEREOF

(71) Applicant: Electronics and Telecommunications Research Institute, Daejeon (KR)

(72) Inventors: Hye Kyung Jwa, Daejeon (KR); Hyung Jong Yang, Ulsan (KR); Jee Hyeon Na, Daejeon (KR); Mu Yong Shin, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/170,239

(22) Filed: Jun. 1, 2016

(65) Prior Publication Data

US 2016/0360538 A1 Dec. 8, 2016

(30) Foreign Application Priority Data

Jun. 4, 2015 (KR) .................. 10-2015-0079204

(51) Int. Cl.
*H04W 84/04* (2009.01)
*H04W 52/24* (2009.01)
*H04W 72/08* (2009.01)
*H04L 5/00* (2006.01)
*H04W 48/12* (2009.01)
*H04W 24/10* (2009.01)
*H04W 48/20* (2009.01)

(52) U.S. Cl.
CPC ......... *H04W 72/085* (2013.01); *H04L 5/0048* (2013.01); *H04W 24/10* (2013.01); *H04W 48/12* (2013.01); *H04W 48/20* (2013.01)

(58) Field of Classification Search
CPC .................. H04W 84/045; H04W 52/244
See application file for complete search history.

(56) References Cited

U.S. PATENT DOCUMENTS

2008/0247330 A1* 10/2008 Ko ................ H04B 7/0617
370/252
2009/0088164 A1* 4/2009 Shen ............... H04B 7/155
455/436

(Continued)

FOREIGN PATENT DOCUMENTS

KR 10-2012-0007997 A 1/2012

OTHER PUBLICATIONS

Hwang, Hae Gwang et al., "A Study on the interference mitigation using the hybrid beamforming for cellular systems," The Korean Institute of Communications and Information Sciences, Autumn Conference, Nov. 24, 2012, 6 pages.

*Primary Examiner* — Dung Hong
(74) *Attorney, Agent, or Firm* — Nelson Mullins Riley & Scarborough LLP

(57) ABSTRACT

Provided is a method of allocating a resource in a small cell system. The method includes: selecting a temporary base station for each user terminal; measuring a signal-to-noise ratio (SNR) through a downlink pilot in a small cell base station; transmitting the signal-to-noise ratio measured for each user terminal to the temporary base station; receiving base station selection and resource allocation information from the small cell base station; and selecting the small cell base station to which most frequency resource block are allocated as a home base station.

10 Claims, 13 Drawing Sheets

(56) References Cited

U.S. PATENT DOCUMENTS

| | | | |
|---|---|---|---|
| 2011/0013600 A1* | 1/2011 | Kim | H04L 5/0085 370/332 |
| 2011/0134887 A1* | 6/2011 | Jeon | H04W 36/0077 370/331 |
| 2012/0127954 A1* | 5/2012 | Lim | H04W 72/082 370/330 |
| 2012/0250552 A1* | 10/2012 | Zhang | H04B 7/0452 370/252 |
| 2013/0143526 A1* | 6/2013 | Kanugovi | H04W 36/0083 455/411 |
| 2013/0272219 A1 | 10/2013 | Singh et al. | |
| 2013/0310058 A1* | 11/2013 | Ibrahim | H04W 72/082 455/452.1 |
| 2014/0315566 A1 | 10/2014 | Lee et al. | |
| 2015/0087343 A1* | 3/2015 | Lee | H04W 36/0055 455/466 |
| 2015/0282142 A1* | 10/2015 | Dahlman | H04W 76/043 370/329 |
| 2015/0365831 A1 | 12/2015 | Ko et al. | |
| 2016/0345250 A1* | 11/2016 | Agyapong | H04W 48/16 |

* cited by examiner

FIG. 5B

| | BS1 | BS2 | BS3 | BS4 |
|---|---|---|---|---|
| UE1 | 12.3 / 14.2 / 10.5 | 14.3 / 13.5 / 10.5 | 23.1 / 20.4 / 29.3 | / 23.1 / 28.1 |
| UE2 | 5.2 / 13.2 / 25.4 | 14.1 / 15.5 / 8.1 | 12.2 / 14.5 / | / 24.1 / 22.4 |
| UE3 | 12.3 / 9.2 / 10.5 | 23.1 / 26.5 / 20.5 | 20.6 / 15.2 / | 30.5 / 23.1 / 23.1 |
| UE4 | 15.3 / 14.2 / 8.5 | 4.5 / 11.2 / 20.6 | 14.5 / 12.5 / | / 20.1 / 12.0 |

Step 2

FIG. 5A

| | BS1 | BS2 | BS3 | BS4 |
|---|---|---|---|---|
| UE1 | 12.3 / 14.2 / 10.5 | 14.3 / 13.5 / 10.5 | 23.1 / 20.4 / 29.3 | / 23.1 / 28.1 |
| UE2 | 5.2 / 13.2 / 25.4 | 14.1 / 15.5 / 8.1 | 12.2 / 14.5 / 12.3 | / 24.1 / 22.4 |
| UE3 | 12.3 / 9.2 / 10.5 | 23.1 / 26.5 / 20.5 | 20.6 / 15.2 / 11.2 | 30.5 / 23.1 / 23.1 |
| UE4 | 15.3 / 14.2 / 8.5 | 4.5 / 11.2 / 20.6 | 14.5 / 12.5 / 10.2 | / 20.1 / 12.0 |

Step 1

Step 3

| | BS1 | | | BS2 | | | BS3 | | | BS4 | | |
|---|---|---|---|---|---|---|---|---|---|---|---|---|
| UE1 | 12.3 | 14.2 | 10.5 | 14.3 | 13.5 | 10.5 | 23.1 | 20.4 | 29.3 |  | 23.1 | 28.1 |
| UE2 | 5.2 | 13.2 | 25.4 | 14.1 | 15.5 | 8.1 | 12.2 | 14.5 |  |  | 24.1 |  |
| UE3 | 12.3 | 9.2 | 10.5 | 23.1 | 26.5 | 20.5 | 20.6 | 15.2 |  | 30.5 | 23.1 |  |
| UE4 | 15.3 | 14.2 | 8.5 | 4.5 | 11.2 | 20.6 | 14.5 | 12.5 |  |  | 20.1 |  |

FIG.5D

Step 4

| | BS1 | | | BS2 | | | BS3 | | | BS4 | | |
|---|---|---|---|---|---|---|---|---|---|---|---|---|
| UE1 | 12.3 | 14.2 | 10.5 | 14.3 |  | 10.5 | 23.1 | 20.4 | 29.3 |  | 23.1 | 28.1 |
| UE2 | 5.2 | 13.2 | 25.4 | 14.1 |  | 8.1 | 12.2 | 14.5 |  |  | 24.1 |  |
| UE3 | 12.3 | 9.2 | 10.5 | 23.1 | 26.5 | 20.5 | 20.6 | 15.2 |  | 30.5 | 23.1 |  |
| UE4 | 15.3 | 14.2 | 8.5 | 4.5 |  | 20.6 | 14.5 | 12.5 |  |  | 20.1 |  |

FIG.5E

Step 5

| | BS1 | BS2 | BS3 | BS4 |
|---|---|---|---|---|
| UE1 | 12.3 / 14.2 / | 14.3 / / 10.5 | 23.1 / 20.4 / 29.3 | / 23.1 / 28.1 |
| UE2 | 5.2 / 13.2 / 25.4 | 14.1 / / 8.1 | 12.2 / 14.5 / | / 24.1 / |
| UE3 | 12.3 / 9.2 / | 23.1 / 26.5 / 20.5 | 20.6 / 15.2 / | 30.5 / 23.1 / |
| UE4 | 15.3 / 14.2 / | 4.5 / / 20.6 | 14.5 / 12.5 / | / 20.1 / |

FIG.5F

Step 6

| | BS1 | BS2 | BS3 | BS4 |
|---|---|---|---|---|
| UE1 | 12.3 / 14.2 / | 14.3 / / 10.5 | 23.1 / 20.4 / 29.3 | / / 28.1 |
| UE2 | 5.2 / 13.2 / 25.4 | 14.1 / / 8.1 | 12.2 / 14.5 / | / 24.1 / |
| UE3 | 12.3 / 9.2 / | 23.1 / 26.5 / 20.5 | 20.6 / 15.2 / | 30.5 / / |
| UE4 | 15.3 / 14.2 / | 4.5 / / 20.6 | 14.5 / 12.5 / | / / |

FIG.5G

Step 7

|  | BS1 | BS2 | BS3 | BS4 |
|---|---|---|---|---|
| UE1 | 12.3  14.2 |  10.5 | 23.1  20.4  29.3 |  28.1 |
| UE2 | 5.2  13.2  25.4 |  8.1 | 14.5 | 24.1 |
| UE3 |  | 23.1  26.5  20.5 |  | 30.5 |
| UE4 | 15.3  14.2 | 20.6 | 12.5 |  |

FIG.5H

Step 8

|  | BS1 | BS2 | BS3 | BS4 |
|---|---|---|---|---|
| UE1 |  |  | 23.1  29.3 |  28.1 |
| UE2 | 5.2  13.2  25.4 |  | 14.5 | 24.1 |
| UE3 |  | 23.1  26.5 |  | 30.5 |
| UE4 | 15.3  14.2 | 20.6 | 12.5 |  |

FIG.5I

Step 9

|  | BS1 | BS2 | BS3 | BS4 |
|---|---|---|---|---|
| UE1 |  |  | 23.1 / 29.3 | 28.1 |
| UE2 | 13.2 / 25.4 |  | 14.5 | 24.1 |
| UE3 |  | 23.1 / 26.5 |  | 30.5 |
| UE4 | 15.3 / 14.2 | 20.6 | 12.5 |  |

FIG.5J

Step 10

|  | BS1 | BS2 | BS3 | BS4 |
|---|---|---|---|---|
| UE1 |  |  | 23.1 / 29.3 | 28.1 |
| UE2 | 25.4 |  | 14.5 | 24.1 |
| UE3 |  | 23.1 / 26.5 |  | 30.5 |
| UE4 | 15.3 / 14.2 | 20.6 |  |  |

FIG.5K

Step 11

| | BS1 | BS2 | BS3 | BS4 |
|---|---|---|---|---|
| UE1 | | | 23.1 | |
| | | | | |
| | | | 29.3 | 28.1 |
| UE2 | | | | |
| | | | 14.5 | 24.1 |
| | 25.4 | | | |
| UE3 | | 23.1 | | 30.5 |
| | | 26.5 | | |
| | | | | |
| UE4 | 15.3 | | | |
| | 14.2 | | | |
| | | 20.6 | | |

$E_j$ = j RB INDEX ALLOCATED TO j-th USER
     = {$(a_{j1}, b_{j1}), (a_{j2}, b_{j2}), \cdots, (a_{jk}, b_{jk})$} a:BASE STATION INDEX
b:RB index

SMALL CELL SYSTEM AND METHOD FOR ALLOCATING RESOURCE THEREOF

CROSS-REFERENCE TO RELATED APPLICATION

This application claims the benefit of priority to Korean Patent Application No. 10-2015-0079204, filed on Jun. 4, 2015 in the Korean Intellectual Property Office, the disclosure of which is incorporated herein in its entirety by reference.

BACKGROUND OF THE INVENTION

Field of the Invention

The present disclosure relates to a small cell system and a method for allocating a resource thereof, and more particularly, to a technology of selecting a base station and allocating an orthogonal frequency division multiplexing (OFDM) resource in a small cell system.

Description of the Related Art

In a conventional cellular system, when selecting a base station, an average signal-to-noise ratio (hereinafter, referred to as SNR) is measured through a downlink pilot to select a base station having the largest SNR. After the base station is selected, each base station independently allocates resources of a serving user. Since all small cells can perform independently user selection and resource allocation without sharing information between small cells by using the above described method, it is most simple in terms of implementation complexity. However, since such a method does not consider at all the interference from other small cells, the SNR performance is not ensured such that the performance is degraded significantly as the density of the small cell becomes higher.

On the other hand, a coordinated multi-point (CoMP) method shares all information such as a channel of all user, data, and the like by a plurality of base stations through a direct link backhaul (e.g., X2 link in a 3GPP LTE system) between base stations and accomplishes cooperatively a resource allocation, a user selection, and a data transmission. Typically, such a cooperative method requires the most expensive cost for the backhaul installation and the highest complexity for the implementation, but it can be expected to achieve a high performance compared to the above independent method.

Since the backhaul exists between small cells within a cluster, such a cooperative user selection and resource allocation method is necessary to increase performance. However, the backhaul between the small-cell base stations defined in the 3GPP has various types ranging from an ideal case of a 10 Gbps to a 10 Mbps wireless backhaul. A compatibility for supporting these various backhauls is essentially required in a next generation LTE system. However, the conventional method has strict requirements necessary for the performance of backhaul for each technology, and lacks a compatibility and a flexibility for supporting various backhaul performances.

In addition, since tens or hundreds of users exist in a next-generation small cell network, there is a limit of cooperatively selecting a user and optimizing the resource allocation with respect to those many users. Furthermore, in order to accomplish the user selection and the resource allocation for optimizing a signal-to-noise-plus-interference ratio (SINR), each user terminal have to measure the signal strength between a plurality of small-cell base stations and report this through a feedback. Hence, there is a burden in that such an overhead significantly increases as the number of users increase.

SUMMARY OF THE INVENTION

The present disclosure has been made in view of the above problems, and provides a method of accomplishing a user selection for each small cell base station and a downlink resource allocation and cooperatively transmitting a data, by utilizing a backhaul between small cells of various performances in an OFDM-based 3GPP LTE small cell system.

The present disclosure further provides a method that can achieve a flexible design suitable for a given backhaul performance, and can achieve a user selection having a simple computation complexity and a resource allocation in a situation in which a large number of users exist within a small cell.

The present disclosure further provides a method that can adjust a signal measurement of a user terminal and a feedback overhead according to a given requirement.

The present disclosure further provides a structure that transmits a downlink data in the form of a partial CoMP while flexibly adjusting an amount of user data information exchange between small cell base stations according to the backhaul performance.

In accordance with an aspect of the present disclosure, a method of allocating a resource in a small cell system includes: selecting a temporary base station for each user terminal; measuring a signal-to-noise ratio (SNR) through a downlink pilot in a small cell base station; transmitting the signal-to-noise ratio measured for each user terminal to the temporary base station; receiving base station selection and resource allocation information from the small cell base station; and selecting the small cell base station to which most frequency resource block are allocated as a home base station. Measuring a signal-to-noise ratio includes calculating an average SNR of k-th resource block in a channel between i-th small cell base station and j-th user terminal based on a parameter according to a performance of backhaul. Measuring a signal-to-noise ratio includes measuring a signal-to-noise ratio according to a following equation, $$\overline{SNR}_{i,j}^{k} = \Sigma_{t=1}^{T} \Sigma_{f=k+1}^{k+F} SNR_{i,j}(f,t)$$ [Equation 1]

wherein, $SNR_{i,j}$ (f, t) denotes a SNR values in t-th time slot of f-th subcarrier, $N_{UE}$ denotes the number of user terminals in a cluster, $N_{RB}$ denotes the number of small cell base stations in the cluster, F denotes a first parameter indicating the performance of backhaul, and T denotes a second parameter indicating the performance of backhaul.

Measuring a signal-to-noise ratio includes setting the first parameter or the second parameter to a small value when a capacity of backhaul between small cells base stations is large, and setting to a large value when a capacity of backhaul between small cells base stations is small.

In accordance with another aspect of the present disclosure, a method of allocating a resource in a small cell system includes: performing a base station selection for each user and resource allocation that maximize a signal-to-noise-plus-interference ratio (SINR) by using a signal-to-noise ratio (SNR) feedbacked from a user terminal; broadcasting base station selection for each user and resource allocation information; and sharing a user terminal data necessary for all small cell base stations by using the resource allocation information and performing a downlink data transmission cooperatively. Performing a base station selection for each user and a resource allocation includes sharing the signalto-noise ratio feedbacked from the user terminal and calculating an average SINR by using the signal-to-noise ratio, by the small cell base stations. Performing a base station selection for each user and a resource allocation includes calculating the average SINR according to a following equation 2, $$\text{SINR}_{i,j}^k = \frac{\overline{SNR}_{i,j}^k}{\sum_{m=1, m \neq i}^{N_{RB}} \overline{SNR}_{m,j}^k + N_0}$$ [Equation 2]

wherein, i=1, ..., $N_{RB}$ and, $N_0$ is a variance of a reception noise signal.

Performing a base station selection for each user and a resource allocation includes allocating a first user terminal to a first resource block in a first small cell base station which has a maximum SINR value among resource blocks, and removing slots of the first resource block of a second small cell base station of a second user terminal and a third user terminal, and the first resource block of a third small cell base station, when the first to a third resource blocks exist between the first to the third user terminals, and between the first to the third small cell base stations. Performing a base station selection for each user and a resource allocation includes allocating the second user terminal to a second resource block in the first small cell base station which has a maximum SINR value among non-allocated resource blocks, after allocating or removing the resource block, and removing slots of the second resource block of a second small cell base station of the first user terminal and the third user terminal, and the second resource block of the third small cell base station. Performing a base station selection for each user and a resource allocation includes allocating resources by a calculation method of linearly increasing as the number of user terminals increases. Performing a downlink data transmission cooperatively includes sharing a data to be allocated to each resource block with a corresponding small cell base station by a home base station selected by the user terminal.

In accordance with another aspect of the present disclosure, a small cell system includes: a base station selection and resource allocation unit configured to perform a base station selection for each user and resource allocation by using a signal-to-noise ratio (SNR) feedbacked from a user terminal within a cluster; a broadcast unit configured to broadcast base station selection and resource allocation information determined by the base station selection and resource allocation unit; and a cooperative transmission unit configured to share user data information with all small cell base stations within the cluster by using the resource allocation information and perform a downlink data transmission cooperatively. The base station selection and resource allocation unit performs the base station selection for each user and resource allocation that maximizes a signal-to-noise-plus-interference ratio (SINR) by using the signal-to-noise ratio. The base station selection and resource allocation unit allocates a first user terminal to a first resource block in a first small cell base station which has a maximum SINR value among resource blocks, and removes slots of the first resource block of a second small cell base station of a second user terminal and a third user terminal, and the first resource block of a third small cell base station, when the first to a third resource blocks exist between the first to the third user terminals, and between the first to the third small cell base stations. The base station selection and resource allocation unit performs the allocation or the removal of the resource block with respect to all resource blocks. The base station selection and resource allocation unit shares the signal-to-noise ratio feedbacked from the user terminal with all small cell base stations within the cluster.

BRIEF DESCRIPTION OF THE DRAWINGS

The objects, features and advantages of the present disclosure will be more apparent from the following detailed description in conjunction with the accompanying drawings, in which:

FIG. 5A to FIG. 5K are diagrams illustrating sequentially a procedure of selecting a base station and allocating resources according to an embodiment of the present disclosure;

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure relates to a technology of selecting a base station and allocating an orthogonal frequency division multiplexing (OFDM) resource in a small cell system by utilizing information of exchanging backhaul by several small cell base stations inside a small cell cluster.

Hereinafter, embodiments of the present disclosure are described in detail with reference to FIG. 1 to FIG. 7B.

Figure 1:
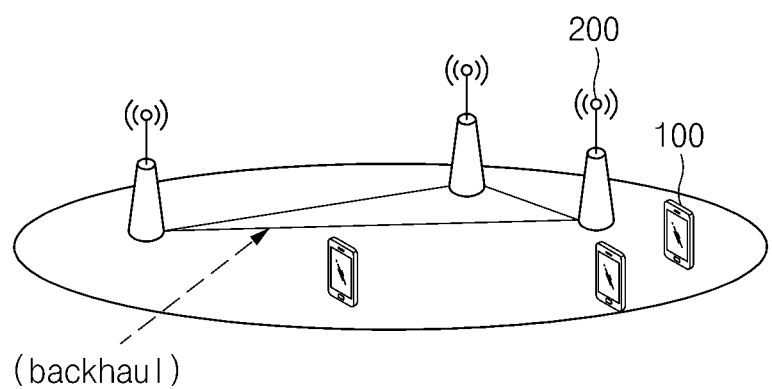
FIG. 1 is a diagram illustrating a configuration of a small cell cluster model according to an embodiment of the present disclosure.

FIG. 1 is a diagram illustrating a configuration of a small cell cluster model according to an embodiment of the present disclosure.

Referring to FIG. 1, a plurality of small cells 200 may exist within a cluster, and user terminals 100 that exist in the cluster may perform a base station selection process for selecting a certain base station as a home base station. The method for selecting a small cell base station is described with reference to FIG. 2 and FIG. 3.

Figure 2:
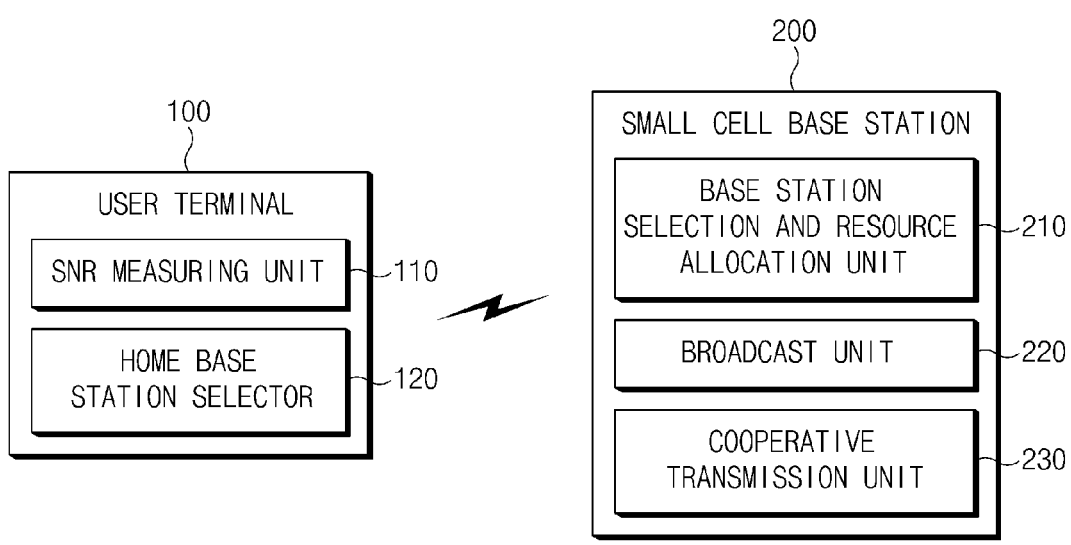
FIG. 2 is a diagram illustrating a configuration of a small cell system according to an embodiment of the present disclosure.

FIG. 2 is a diagram illustrating a configuration of a small cell system according to an embodiment of the present disclosure.

Referring to FIG. 2, the small cell system according to an embodiment of the present disclosure may include the user terminal 100 and the small cell base station 200.

The user terminal 100 may measure an average SNR value for each small cell base station and select the small cell base station to which a frequency resource block is most assigned as a home base station. To this end, the user terminal 100 may include a SNR measuring unit 110, and a home base station selector 120.

The SNR measuring unit 110 may estimate a SNR value for each frequency resource block (RB) and for each small cell base station, and feedback a temporary home base station on this. The SNR measuring unit 110 may calculate the average SNR of k-th resource block in a channel between i-th base station and j-th user terminal on the basis of given parameters T and F according to the backhaul performance, as shown in the following Equation 1.

$$\overline{SNR}_{i,j}^k = \Sigma_{t=1}^{T} \Sigma_{f=k+1}^{k+F} SNR_{i,j}(f,t)$$ [Equation 1]

Equation 1 is a SNR average value calculation method according to the parameters T and F, and $i=1, \ldots, N_{RB}$, $j=1, \ldots, N_{UE}$.

The $SNR_{i,j}$ (f, t) may denote the SNR value in t-th time slot of f-th subcarrier, $N_{UE}$ may denote the number of user terminal in the cluster, and $N_{RB}$ may denote the number of small cell base station in the cluster.

In the case of the determination of F value, the number of resource blocks (RB) may be adjusted by using a small F value when the capacity of the backhaul between the small cell base stations 200 is large, and using a big F value when the capacity of the backhaul between the small cell base stations 200 is small, thereby reducing an amount of SNR feedback and reducing an amount of information exchange between small cell base stations.

In the case of the determination of T value, a small T value may be used if the information exchange and the base station selection/resource allocation can be achieved frequently as the capacity of the backhaul between small cell base stations 200 is large, and a large T value may be used if the capacity of the backhaul between small cell base stations 200 is small.

The home base station selector 120 may select a temporary base station for the feedback of the SNR values. In addition, the home base station selector 120 may designate the base station which has the greatest number of frequency resource blocks allocated from the small cell base station 200 as the home base station, and then set the home base station to a main communication base station.

The small cell base station 200 may perform the base station selection and resource allocation for each user by using the SNR values which are respectively feedbacked from the user terminals 100. To this end, the small cell base station 200 may include a base station selection and resource allocation unit 210, a broadcast unit 220, and a cooperative transmission unit 230.

The base station selection and resource allocation unit 210 may perform a base station selection and resource allocation for each user method that maximizes the SINR by using the SNR values which are feedbacked to all small cell base stations within the cluster.

All small cell base stations 200 within the cluster may share the SNR values which are feedbacked for each user, and the base station selection and resource allocation unit 210 may calculate an average SINR as shown in the following Equation 2.

$$SINR_{i,j}^k = \frac{\overline{SNR}_{i,j}^k}{\sum_{m=1, m \neq i}^{N_{RB}} \overline{SNR}_{m,j}^k + N_0}$$ [Equation 2]

wherein, $i=1, \ldots, N_{RB}$, and $N_0$ is a variance of received noise signal.)

Figure 4:
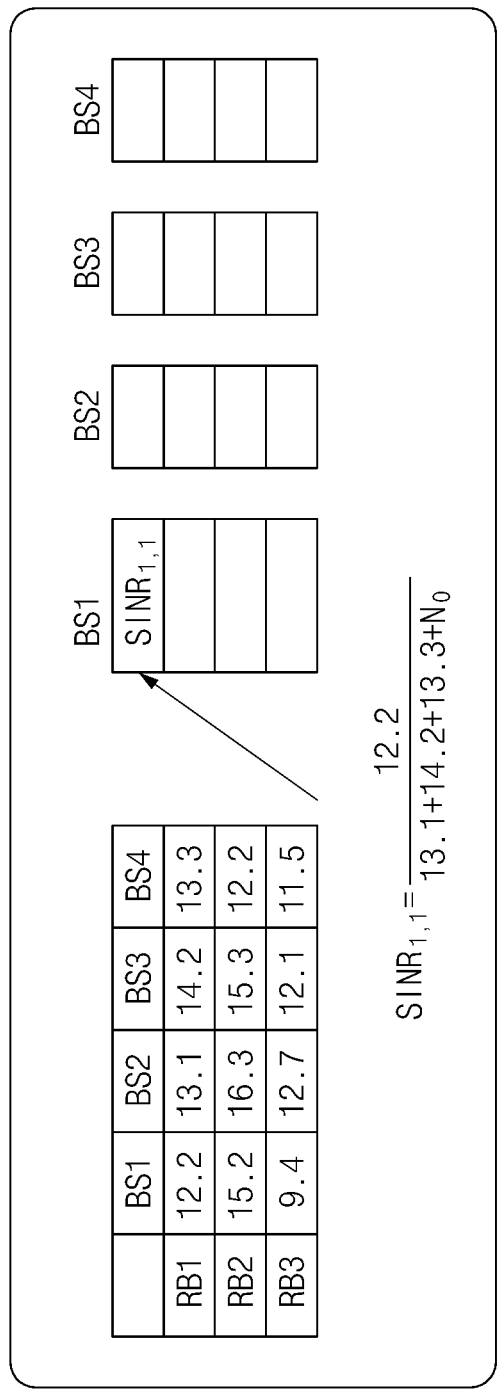
FIG. 4 is a diagram illustrating an example of SINR calculation according to an embodiment of the present disclosure.

FIG. 4 illustrates a procedure of setting F so that the number of resource block may be three, and calculating an average SINR by using the average SINR (the left table in FIG. 4) for each base station for each resource block which is feedbacked when four base stations exist in the cluster.

As shown in FIG. 4, when the average SNR of the small cell base station BS1 is 12.2, the average SNR of the small cell base station BS2 is 13.1, the average SNR of the small cell base station BS3 is 14.2, and the average SNR of the small cell base station BS4 is 13.3, the $SINR_{1,1}$ is a value that divides 12.2 by $13.1+14.2+13.3+N_0$.

The base station selection and resource allocation unit 210 may select a base station for each user which maximizes the SINR, and perform resource allocation. A detailed resource allocation method is described with reference to FIG. 5A to FIG. 5K.

The broadcast unit 220 may broadcast the determined base station selection and resource allocation information so that all user terminals 200 in the cluster may know the determined base station selection and resource allocation information.

The cooperative transmission unit 230 may share user data information required between all small cell base stations by using given resource allocation information and perform a downlink data transmission cooperatively.

Figure 3:
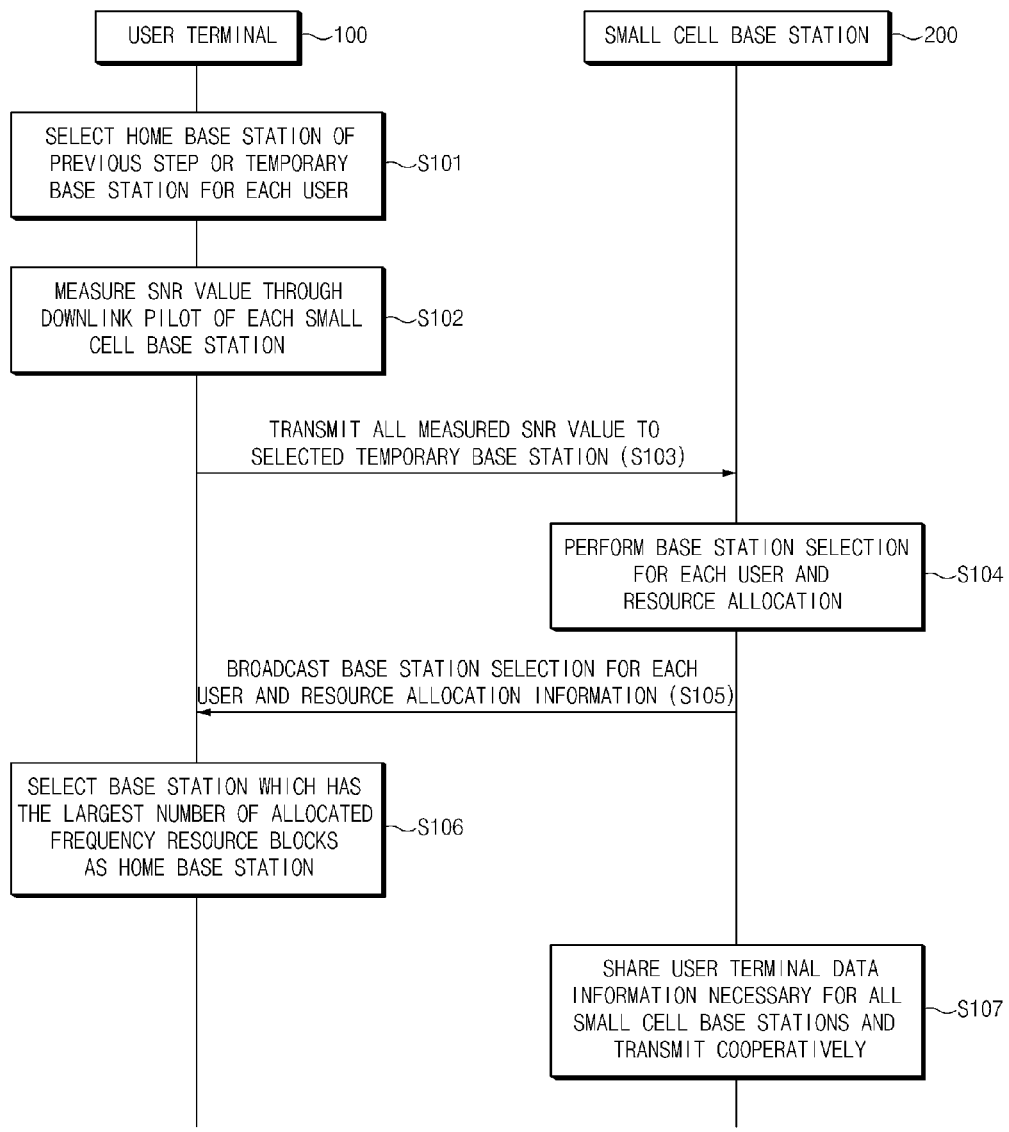
FIG. 3 is a flowchart illustrating a method of selecting a base station in a small cell system and allocating resources according to an embodiment of the present disclosure.

Hereinafter, the method of selecting a base station in a small cell system and allocating resources according to an embodiment of the present disclosure is described with reference to FIG. 3.

First, the user terminal 100 may select a temporary base station for feeding back the SNR values or select the home base station which is selected in the previous step (S101). Typically, the base station having the largest SNR may be selected as a temporary base station by using a downlink pilot from various base stations.

The user terminal 100 may measure the average SNR value for each frequency resource block (RB), and for each small cell base station (S102) and feed back this to the temporary home base station (S103).

The small cell base station 200 may perform the base station selection and resource allocation for each user method that maximizes the SINR by using the SNR values which are feedbacked (S104).

The base station selection and resource allocation method is described with reference to FIG. 5A and FIG. 5K. In this case, FIG. 5A and FIG. 5K illustrate the base station selection and the resource allocation on the assumption that four user terminals are UE1, UE2, UE3, UE4, four small cell base stations are BS1, BS2, BS3, BS4, and three resource blocks for each small cell base station and user terminal are RB1, RB2, RB3. At this time, resource blocks for each small cell base station RB1, RB2, RB3 may store the SINR value calculated through Equation 2 as shown in FIG. 4.

First, to describe a first step, referring to FIG. 5A, the user terminal UE3 may be allocated to the resource block RB1 in the small cell base station BS4 corresponding to the SINR maximum value 30.5, among all resource blocks. Thus, since the resource block RB1 of the small cell base station BS4 cannot be allocated to other user terminals UE1, UE2, UE3, the slot of RB1/BS4 of other user terminals UE1, UE2, UE3 may be removed.

Referring to FIG. 5B, the user terminal UE1 may be allocated to the resource block RB3 of the small cell base station BS3 corresponding to the SINR value 29.3 which is next to the maximum value 30.5 among the non-allocated resource blocks. Thus, as in FIG. 5A, since the resource block RB3 of the small cell base station BS3 cannot be allocated to other user terminals UE2, UE3, UE4, the slot of RB3/BS4 of other user terminals UE2, UE3, UE4 may be removed.

Referring to FIG. 5C, the user terminal UE1 may be allocated to the resource block RB3 of the small cell base station BS4 corresponding to the SINR value 28.1 which is next to the value 29.3 among the non-allocated resource blocks. Thus, as in FIG. 5B, since the resource block RB3 of the small cell base station BS4 cannot be allocated to other user terminals UE2, UE3, UE4, the slot of RB3/BS3 of other user terminals UE2, UE3, UE4 may be removed.

Thereafter, FIG. 5D, FIG. 5E, FIG. 5F may sequentially allocate the resource block having the SINR maximum value among the non-allocated resource block to a corresponding user terminal, and sequentially perform all operation of removing the slot with respect to other user terminal.

Referring to FIG. 5G, the user terminal UE3 may be allocated to the resource block RB1 of the small cell base station BS2 corresponding to the SINR value 23.1 which is the maximum among the unallocated resource block and may be allocated to the resource block RB1 of the small cell base station BS3. Thus, all SINR values corresponding to the user terminal UE3 may be removed by removing the slot of RB1/BS3 of the user terminal UE2, UE3, UE4 and the slot of RB1/BS2 of the user terminal UE1, UE2, UE4.

Thereafter, FIG. 5H, FIG. 5I, FIG. 5J may sequentially allocate the resource block having the SINR maximum value among the non-allocated resource block to a corresponding user terminal, and sequentially perform all operation of removing the slot with respect to other user terminal. Finally, FIG. 5K illustrates a state in which all resource allocation is completed.

When the resource is allocated in such a manner, it is possible to perform the base station selection and resource allocation method with a calculation complexity which is linearly increased as the number of user is increased.

The small cell base station 200 may broadcast the determined base station selection and resource allocation information so that all user terminals 100 in the cluster may know the determined base station selection information and resource allocation information (S105).

The user terminal 100 may designate the base station which has the largest number of allocated frequency resource blocks (RB) as a home base station, and set the designated home base station as a main communication base station later (S106). Referring to FIG. 5K, the user terminal UE1 may designate the small cell base station BS3 to which the resource blocks are most allocated as a home base station, the user terminal UE3 may designate the small cell base station BS2 to which the resource blocks are most allocated as a home base station, the user terminal UE4 may designate the small cell base station BS1 to which all of the resource blocks are allocated as a home base station.

Then, the small cell base station 200 may share user terminal data information necessary for all small cell base stations by using a given resource allocation information and perform the downlink data transmission cooperatively (S107).

Figure 6:
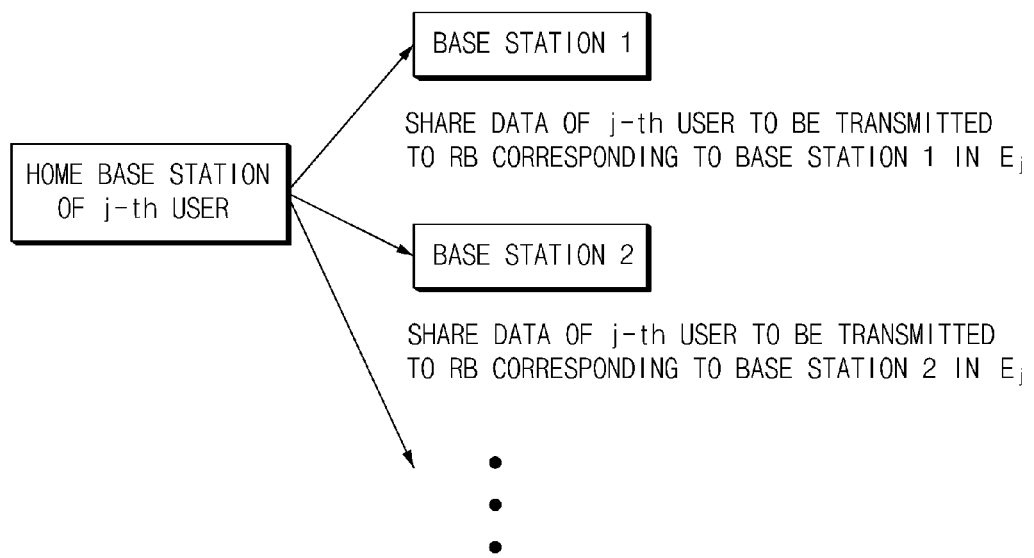
FIG. 6 is a conceptual diagram illustrating a configuration of a transmission data sharing according to an embodiment of the present disclosure.

Referring to FIG. 6 which discloses a conceptual diagram of sharing transmission data between base stations, each home base station may transmit the transmission data to be allocated to each resource block which is allocated to each user terminal to a corresponding base station to minimize a backhaul usage.

For example, as shown in FIG. 6, it is assumed that the resource allocation information of j-th user is $E_j=\{(a_{j1}, b_{j1}), (a_{j2}, b_{j2}), \ldots, (a_{jK}, b_{jK})\}$. At this time, $a_{jm}$ $b_{jm}$ represents an allocated m-th base station index and a corresponding resource block index. The home base station may transmit the data to be allocated to each resource block to a corresponding base station, and transmit the data of user allocated for each resource block after all base stations completes the information exchange.

Thus, the present disclosure is able to reduce the interference between small cells, maximize the strength of signal, and improve the SINR of each user and an average transfer rate.

Figure 7A:
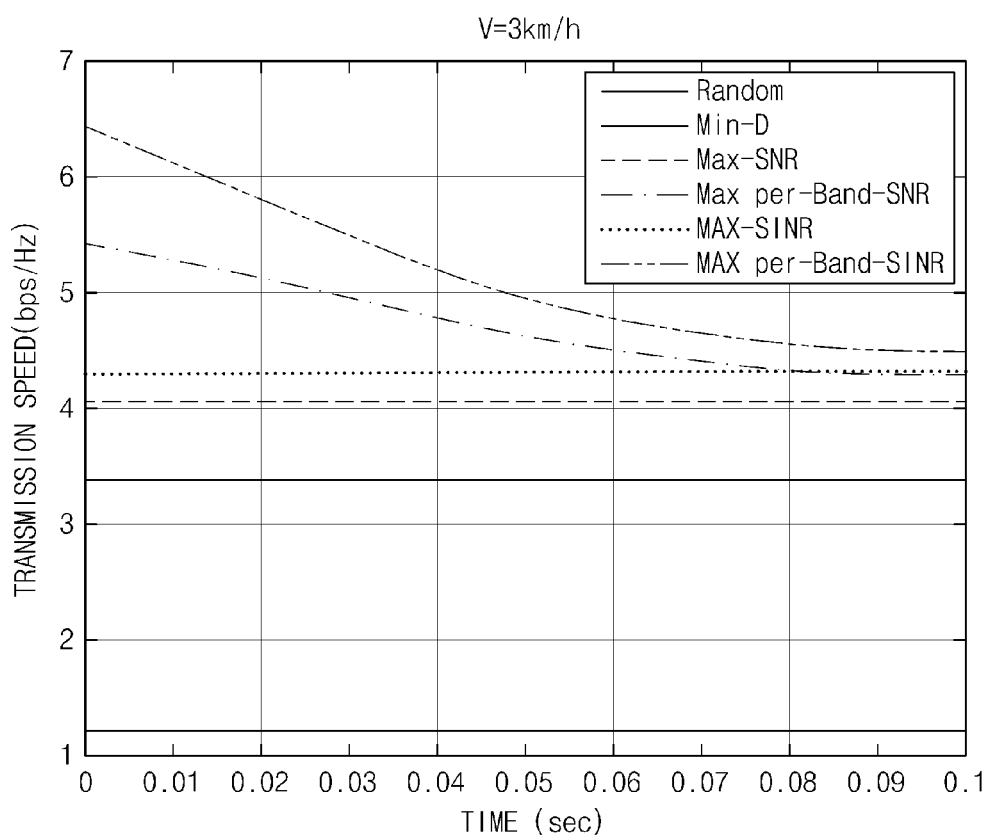
FIG. 7A is a graph for comparing a performance of a transmission speed for each time in a small cell system according to an embodiment of the present disclosure.
Figure 7B:
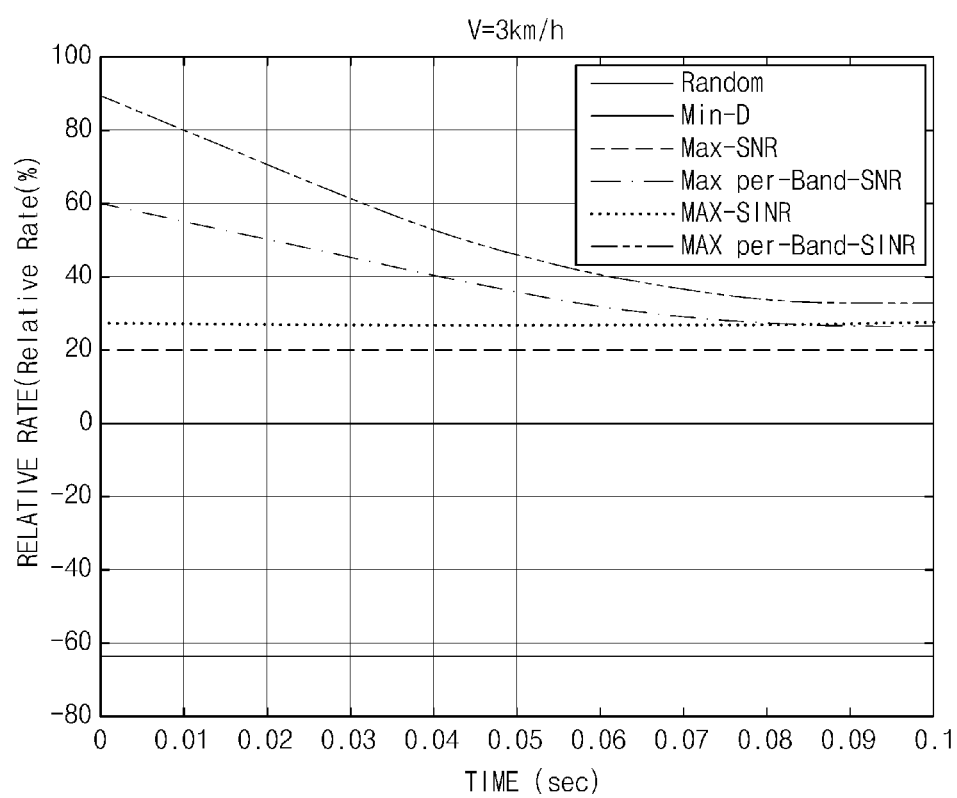
FIG. 7B is a graph for comparing a relative ratio performance for each time in a small cell system according to an embodiment of the present disclosure.

FIG. 7A is a graph for comparing a performance of a transmission speed for each time in a small cell system according to an embodiment of the present disclosure, and FIG. 7B is a graph for comparing a relative ratio performance for each time in a small cell system according to an embodiment of the present disclosure.

Referring to FIG. 7A and FIG. 7B, Random may indicate the case of performing a resource allocation randomly, Min-D may indicate the case of completing the base station selection through a long-term SNR, that is, the distance to the base station, and performing a max-SNR resource allocation for each selected home base station independently, and Max-SNR may indicate the case of selecting a base station having the maximum average SNR value of all frequency domain from the downlink pilot of each base station, and performing the Max-SNR type resource allocation method independently after selecting the base station. Max-SINR may indicate the case of selecting a base station having the maximum average SINR value of all frequency domain from the downlink pilot of each base station, and performing the Max-SINR type resource allocation method independently after selecting the base station.

FIG. 7A and FIG. 7B illustrate the case of applying a Max per-Band SINR method that is the resource allocation method according to the present disclosure and a Max per-Band SNR method that simplifies the base station selection and resource allocation method metric using SNR not SINR.

FIG. 7A and FIG. 7B illustrate that the performance is compared in a system that has a 2 GHz center frequency, a 10 Mhz bandwidth, and 1024 subcarriers when four small cells exist in the cluster. Scenarios and simulation environment used ones corresponding to a scenario number one of a document 3GPP TR 26.982. In addition, the parameter for the measurement of the average SNR may be set to T=1, F=16 to reduce the amount of information exchange through the backhaul, and achieve a real time improvement by utilizing the suggested linear complexity resource allocation method. Referring to FIG. 7A and FIG. 7B, the Max per-Band SNR method according to an embodiment of the present disclosure may indicate the highest performance in a situation in which the traveling speed of the terminal is 3 km/h, and, in particular, it can be seen that the performance gain of the Max per-Band SINR method is 40% or more higher than the Min-D method that is a long-term SNR during a time before 0.05 sec.

The present disclosure can reduce the interference between small cells and maximize the size of a signal to improve the SINR of each user and an average transfer rate.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method of allocating a resource in a small cell system, the method comprising:
    performing a base station selection for each user and resource allocation that maximize a signal-to-noise-plus-interference ratio (SINR) by using a signal-to-noise ratio (SNR) feedbacked from a user terminal;
    broadcasting base station selection for each user and resource allocation information; and
    sharing a user terminal data necessary for all small cell base stations by using the resource allocation information and performing a downlink data transmission cooperatively,
    wherein performing a base station selection for each user and a resource allocation comprises allocating a first user terminal to a first resource block in a first small cell base station which has a maximum SINR value among resource blocks, and removing slots of the first resource block of a second small cell base station of a second user terminal and a third user terminal, and the first resource block of a third small cell base station, when the first to a third resource blocks exist between the first to the third user terminals, and between the first to the third small cell base stations.

2. The method of claim 1, wherein performing a base station selection for each user and a resource allocation comprises sharing the signal-to-noise ratio feedbacked from the user terminal and calculating an average SINR by using the signal-to-noise ratio, by the small cell base stations.

3. The method of claim 1, wherein performing a base station selection for each user and a resource allocation comprises allocating the second user terminal to a second resource block in the first small cell base station which has a maximum SINR value among non-allocated resource blocks, after allocating or removing the resource block, and removing slots of the second resource block of a second small cell base station of the first user terminal and the third user terminal, and the second resource block of the third small cell base station.

4. The method of claim 1, wherein performing a base station selection for each user and a resource allocation comprises allocating resources by a calculation method of linearly increasing as the number of user terminals increases.

5. The method of claim 1, wherein performing a downlink data transmission cooperatively comprises sharing a data to be allocated to each resource block with a corresponding small cell base station by a home base station selected by the user terminal.

6. A method of allocating a resource in a small cell system, the method comprising:
    performing a base station selection for each user and resource allocation that maximize a signal-to-noise-plus-interference ratio (SINR) by using a signal-to-noise ratio (SNR) feedbacked from a user terminal;
    broadcasting base station selection for each user and resource allocation information; and
    sharing a user terminal data necessary for all small cell base stations by using the resource allocation information and performing a downlink data transmission cooperatively,
    wherein performing a base station selection for each user and a resource allocation comprises sharing the signal-to-noise ratio feedbacked from the user terminal and calculating an average SINR by using the signal-to-noise ratio, by the small cell base stations,
    wherein performing a base station selection for each user and a resource allocation comprises calculating the average SINR according to a following equation 2, $$SINR_{i,j}^k = \frac{\overline{SNR}_{i,j}^k}{\sum_{m=1, m\neq i}^{N_{RB}} \overline{SNR}_{m,j}^k + N_0}$$ [Equation 2]

wherein, $i=1, \ldots, N_{RB}$ and, $N_0$ is a variance of a reception noise signal.

7. A small cell system comprising:
    a base station selection and resource allocation unit configured to perform a base station selection for each user and resource allocation by using a signal-to-noise ratio (SNR) feedbacked from a user terminal within a cluster;
    a broadcast unit configured to broadcast base station selection and resource allocation information determined by the base station selection and resource allocation unit; and
    a cooperative transmission unit configured to share user data information with all small cell base stations within the cluster by using the resource allocation information and perform a downlink data transmission cooperatively,
    wherein the base station selection and resource allocation unit allocates a first user terminal to a first resource block in a first small cell base station which has a maximum SINR value among resource blocks, and removes slots of the first resource block of a second small cell base station of a second user terminal and a third user terminal, and the first resource block of a third small cell base station, when the first to a third resource blocks exist between the first to the third user terminals, and between the first to the third small cell base stations.

8. The small cell system of claim 7, wherein the base station selection and resource allocation unit performs the base station selection for each user and resource allocation that maximizes a signal-to-noise-plus-interference ratio (SINR) by using the signal-to-noise ratio.

9. The small cell system of claim 7, wherein the base station selection and resource allocation unit performs the allocation or the removal of the resource block with respect to all resource blocks.

10. The small cell system of claim 7, wherein the base station selection and resource allocation unit shares the signal-to-noise ratio feedbacked from the user terminal with all small cell base stations within the cluster.

* * * * *